(12) United States Patent
Durina

(10) Patent No.: US 6,752,528 B1
(45) Date of Patent: Jun. 22, 2004

(54) PLASTICATING SCREW FOR EFFICIENT MELTING AND MIXING OF POLYMERIC MATERIAL

(75) Inventor: Michael F. Durina, 6645 Sturbridge Pl., Poland, OH (US) 44514

(73) Assignee: Michael F. Durina, Poland, OH (US)

( * ) Notice: Subject to any disclaimer, the term of this patent is extended or adjusted under 35 U.S.C. 154(b) by 157 days.

(21) Appl. No.: 10/068,509

(22) Filed: Feb. 6, 2002

(51) Int. Cl.⁷ ................................................ B29B 7/42
(52) U.S. Cl. ........................................ 366/88; 366/89
(58) Field of Search .................... 366/79, 81, 83–85, 366/88–90; 425/204, 208, 209

(56) References Cited

U.S. PATENT DOCUMENTS

| | | | |
|---|---|---|---|
| 2,753,595 A | | 7/1956 | Dulmagie |
| 3,006,029 A | | 10/1961 | Saxton |
| 3,368,724 A | * | 2/1968 | Peters et al. ................... 366/88 |
| 3,411,179 A | | 11/1968 | Gregory |
| 3,652,064 A | * | 3/1972 | Lehnen et al. |
| 3,687,423 A | * | 8/1972 | Koch et al. |
| 3,870,284 A | | 3/1975 | Kruder |
| 4,092,015 A | * | 5/1978 | Koch |
| 4,129,386 A | * | 12/1978 | Rauwendaal ................. 366/88 |
| 4,171,196 A | * | 10/1979 | Maillefer |
| 4,184,772 A | | 1/1980 | Meyer |
| 4,199,263 A | | 4/1980 | Menges et al. |
| 4,363,768 A | | 12/1982 | Kruder |
| 4,639,143 A | | 1/1987 | Frankland, Jr. |
| 4,752,136 A | | 6/1988 | Colby |
| 5,071,256 A | | 12/1991 | Smith et al. |
| 5,088,914 A | * | 2/1992 | Brambilla ................... 425/208 |
| 5,397,065 A | * | 3/1995 | Shutov et al. |
| 5,816,698 A | | 10/1998 | Durina |
| 5,961,209 A | * | 10/1999 | Kovacevic |

FOREIGN PATENT DOCUMENTS

WO 88/01227 A1 * 2/1988

OTHER PUBLICATIONS

2000, E.I. DuPont Engineering Polymers Brochure.

* cited by examiner

*Primary Examiner*—Charles E. Cooley

(57) ABSTRACT

A new plasticity apparatus including a rotating and reciprocating screw having a hellcal flight that is wrapped around a core, disposed within and cooperting with the inner wall of a heated barrel that substantially increases the melt quality of a polymeric material. This is accomplished by incorporating an increase in the hefix angle of the primary flight at the taper terminus of the transition section, in cooperation with a stepped change in the root that terminates either upstream or downstream of the end of one complete revolution of the flight.

7 Claims, 3 Drawing Sheets

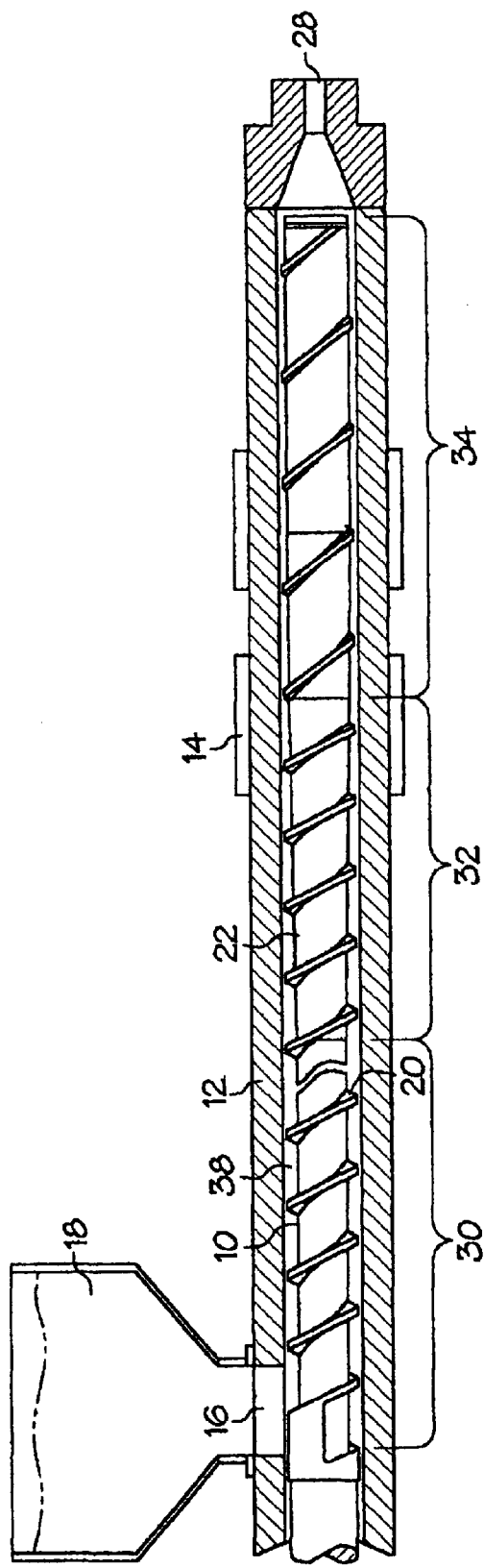
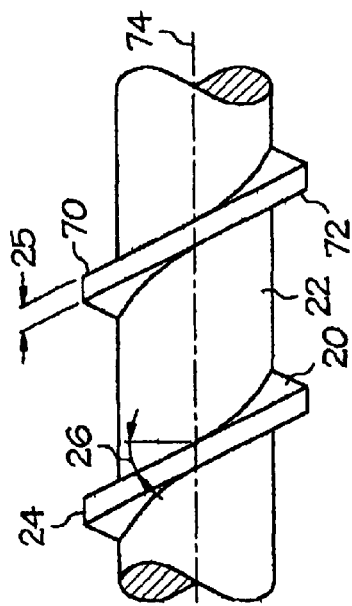
FIG. 1
FIG. 1A

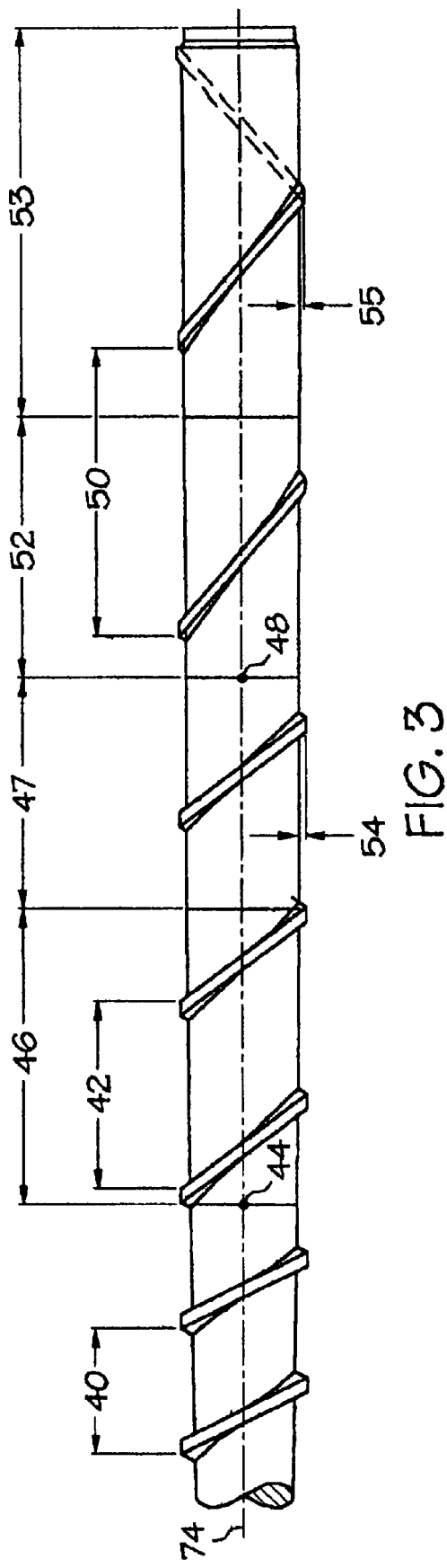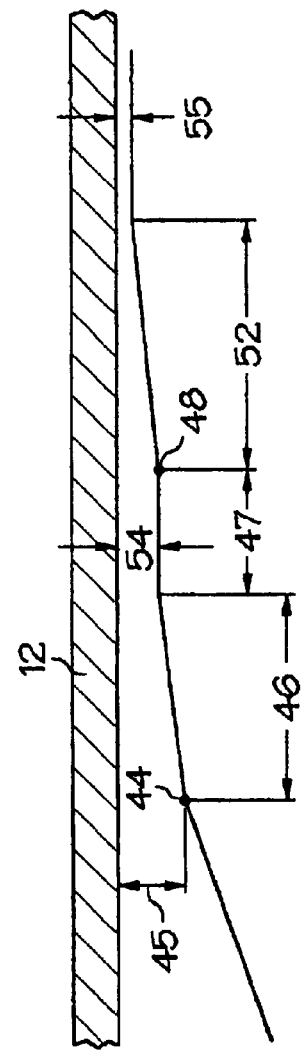

PLASTICATING SCREW FOR EFFICIENT MELTING AND MIXING OF POLYMERIC MATERIAL

BACKGROUND

1. Field of Invention

This invention relates to extruders and injection machines of the type in which a screw rotatable within a barrel is employed to extrude or inject molten resinous material to the outlet port of a plasticity barrel. More particularly, this invention is concerned with thorough melting and mixing resinous material at the end of the transition and into the metering section of the plasticity screw.

2. Background Description of Prior Art

Plasticity equipment commonly used today are of the type which receive polymer pellets or powder, heat and work the polymer to convert it into a melted or molten state before delivering the molten polymer under pressure through a restricted outlet or discharge port. Although there are several different types of plastic polymers each having different physical properties, it is desirable that the extrudate leaving the typical plasticity equipment be fully melted, homogeneously mixed and uniform in temperature, viscosity, color and composition.

The plasticity apparatus induces an elongated cylindrical barrel, which may be heated at various locations along its axial length, and the screw which extends longitudinally through the barrel. The screw has a core with a helical flight thereon and the flight cooperates with the cylindrical inner surface of the barrel to define a helical valley or channel for passage of the resin to the plasticity apparatus outlet port. Although the pitch of the flight can vary it is common to utilize screws of constant pitch. The pitch is the forward distance traversed in one full revolution of the flight. It is also common that screws have a pitch distance that is equal to the outside diameter of said screw. Although there are different screw configurations for different polymer compositions, the typical plasticity screw ordinarily has a plurality of sections along its extended axis with each section being designed for a particular function. Ordinarily, there is a feed section, a transition section and a metering section in series. The plasticity screw feed section extends beneath and forward from a feed opening where a polymer in pellet, powder or regrind form is introduced into the plasticity apparatus to be carried forward along the inside of the barrel. While being carried along said screw axis, the polymer is absorbing heat from said heated cylinder. The depth of said helical flight of the screw in the feed section is usually large enough to overfeed the solid polymer. The overfeeding action serves to compact and pressurize the polymer particles and form a solid bed of advancing material in the plasticity apparatus.

The material is then worked and heated in the transition section so that melting of the polymer occurs as the material is moved forward along said screw axis toward the outlet port. The polymer is passed through the transition section to reduce the root depth of the helical passageway to reflect the volume reduction due to the melting of the feed. The reduction of depth in the transition section also compresses the solid bed of pellets or powder. The transition section leads to a metering section, which has a shallow root depth helical passageway. The preferred geometry moving from the deep feed section to the shallow metering section takes the form of an involute taper geometry. The metering section has as its function the exertion of a constant flow rate pumping action on the molten polymer. In addition, any unmelted solids should be melted in the metering section as well as to mix the melted polymer homogeneously. It is understood that a polymer cannot be mixed properly until it is first melted. Generally, when the metering section begins, if the change in flight depth from feed to metering is sufficient and the length of transition sufficient, the resin is at least 90 percent melted. As previously stated and as described in U.S. Pat. No. 4,752,136, the root depth of the metering section is generally shallow. This shallow depth increases the shear and friction in the polymer, which has a tendency to raise the temperature of the polymer urging the remaining solids to melt. An increase in shear rate and temperature usually has a substantial effect on the viscosity of the polymer. A change in viscosity of the material being plasticated in turn affects the flow rate of the material through the restricted outlet port. As a result, without the optimum screw configuration, there may be a failure to achieve the desired uniformity and output rate of molten polymer, which is a significant problem for the plasticity operation. What makes this task even more difficult is that the current state of the art challenges us with length to pitch and diameter ratios of 12:1 to 27:1. When there is a demand for a high output rate there is frequently polymeric material without the addition of an expensive, complicated mixing section that is typical of advanced screw designs.

To my knowledge there are no designs that make an attempt to increase the flight pitch to achieve a shallower flight depth while maintaining a similar channel volume, in addition there is no relationship between the flight and the root like the present invention employs.

SUMMARY OF THE INVENTION

The present invention is directed to a screw configuration, plasticity apparatus and method for improving melting and mixing of resinous material in the metering section.

In accordance with this invention a plasticity screw having a feed section, transition section and a metering section in series, the flight pitch normally being constant in the feed and transition sections, each section having a flight channel forming a specific channel volume when compared with each other forms a compression ratio with the volume of the feed section being greater than that of the metering section. Said screw having at least one but preferably two or more changes in the flight pitch and root diameter at the end of the transition section and through the metering section with the root stepped in cooperation with an increase in flight pitch. Said changes that are dependent upon the flighted length to screw diameter ratio, screw diameter and resin composite. not enough axial length to accomplish all that is desired and a compromise in melt quality is experienced.

It is desirous to have a metering section with a shallow flight depth so as to assure that there is a substantial shear rate and good conductive heat transfer from the heated cylinder to the polymer. The most effective melting mechanism takes place between the heated barrel and the polymer. When using the state of the art constant pitch compression screw design that is the most prominent screw in use today, a shallow meter depth can only be accomplished with a high compression ratio between said feed helical channels and said metering helical channel. The practice of increasing the taper to achieve a shallower flight depth in the metering section is proven to be counter-productive because as the taper increases the effective melting length of the screw decreases. In addition, a high compression ratio cannot be used with many polymer types because of excessive shear rates therefore this practice is limited in its scope.

Our invention extends the melting length by utilizing a low volumetric compression ratio. In addition, by increasing the flight pitch of the screw at the end of the transition section as seen in FIGS. 2 through 3, the polymer is exposed to more barrel wall surface area and excellent heat transfer. The increase in the flight pitch also increases the velocity between the barrel and the polymer adding a melting and mixing effect. And lastly, by stepping the root in cooperation with the flight pitch change, an added degree of mixing is achieved. So, one skilled in the art would surmise that our invention has created a design that generates a more thoroughly melted and mixed A description of the preferred geometry of the invention follows.

1). The flight depth and pitch of the screw are used to calculate a channel volume. The screw is designed to achieve a given ratio between the channel volumes in the feed section vs. The metering section. At the end of the transition section a tangent point or tapered terminus is reached along the axis of the root that represents a flight depth. The flight depth at that tangent point is or tapered terminus used to calculate a channel volume. A substantial increase of the flight pitch takes place, the purpose being to achieve a similar channel volume with a shallower flight depth. Said change in the flight pitch should be at least 1.25×(times) the pitch used through the feed and transition sections and preferably be about between 1.25 and 1.50. An increase in the pitch or helix angle of the flight has the effect to expose a greater amount of polymeric material to the barrel wall as well as to increase the relative velocity between the barrel and the resin. It is well known to those skilled in the art that the most effective melting occurs between the hot barrel and the polymeric material. The resultant shallower than normal flight channel depth has a greater ability to melt the resin completely because of a higher shear rate and more efficient conductive heat transfer even though the volumetric compression ratio remains low which assures a longer axial length of melting ability. The change in velocity has the effect to add a degree of melting and homogenous mixing to the hot resinous material.

2). In the invention, the increase in pitch occurs in conjunction with a change in the root diameter, so as the flight pitch increases, the root of the screw transitions from a deep flight depth to a shallow flight depth. The stepped change in the root that starts at the same tangent point or tapered terminus as the increase in pitch ends preferably about between 0.7 to 0.9 or 1.1 to 1.3 times the length of the increased flight pitch, namely upstream or downstream of the end of one complete revolution of the flight.

3). An option that executes two flight pitch increases in succession that are separated by a constant depth metering section, said first flight pitch is about between 1.20 to 1.30 times the original flight pitch, said second flight pitch is about between 1.35 to 1.50 times the original flight pitch. The first change in the root that starts at the same tangent point or tapered terminus as the increase in the first pitch ends preferably about between 0.7 to 0.9 or 1.1 to 1.3 times the length of the increased flight pitch, namely upstream or downstream of one complete revolution of the flight. The second change in the root ends preferably about between 0.7 to 0.9 or 1.1 to 1.3 times the length of the increased flight pitch, namely upstream or downstream of one complete revolution of the flight. It is understood that multiple changes in the flight and root profile while subjecting the resinous material to our substantially shallower metering flight depths are good for melting and mixing.

BRIEF DESCRIPTION OF THE DRAWINGS

FIG. 1 shows a plasticity apparatus having a cylindrical barrel and a screw disposed FIG. 1A is an enlarged screw channel cross section;

FIG. 3 shows a section of a screw flight profile, end of transition through the metering section, with a double flight and root change; and FIG. 3A is the root profile of FIG. 3.

DESCRIPTION OF THE PREFFERED EMBODIMENTS

Figure 2:
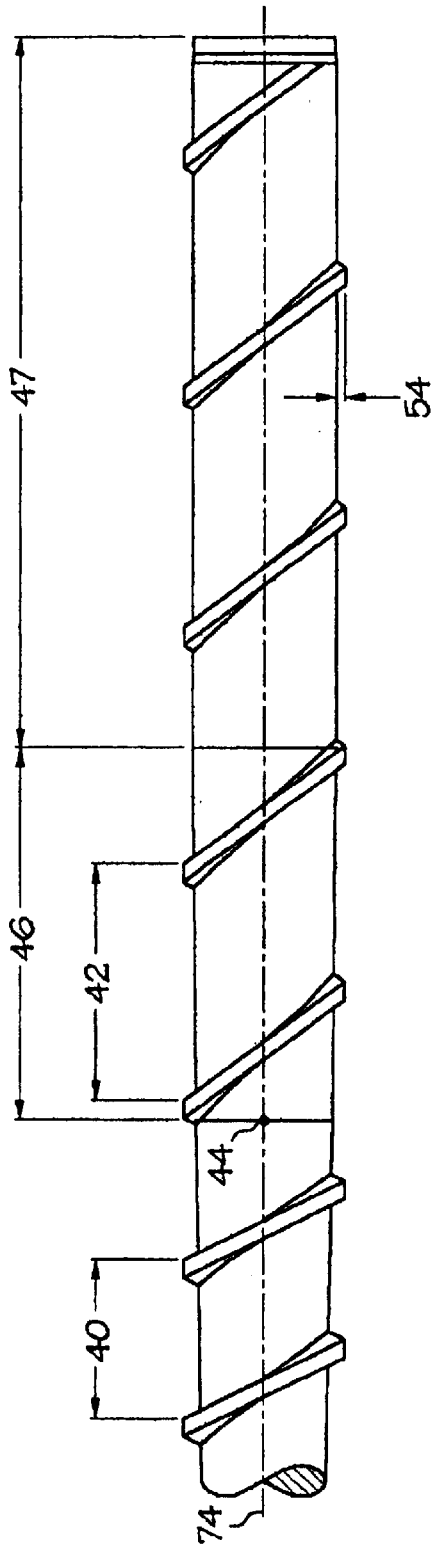
FIG. 2 shows a section of a screw flight profile, end of transition through the metering section, with a single flight and root change.

Referring to FIG. 1, a plasticity screw apparatus can be seen including a cylindrical barrel 12 having a cylindrical inner lining surface. The barrel 12 is provided with a hopper 18 filled with solid resinous material particles and an inlet port 16 for admission of one or more solid particulate resinous materials and any required additives or agents. The barrel is also provided with a discharge port 28 for the discharge of plasticated molten resinous material. Any conventional healing means 14 can be provided on the outside of the barrel 12 for applying heat energy to the barrel 12. Referring to FIGS. 1 and 1A, within the barrel 12 is a screw 10 which is rotated and sometimes reciprocated by means not shown. The screw 10 induces a single helical flight 20 winding around a core 22. The flight includes a flight land 24, which moves in close cooperative association with respect to the inner surface of the barrel 12. The axial distance between comparable points on the adjacent flights represents the pitch of the flight. The helix angle 26 that is formed by the flight in relation to the screw axis is shown in FIG. 1A.

A flight 20, a core 22, bounded by a flight 20 and the inner surface of the barrel 12 define the flight channel 38. The surface of the core 22 is referred to as the root of the screw. The screw 10 includes a relatively deep root feed section 30 for the admission, heating working and solids conveying of the resinous material, a transition section 32 of reducing depth to adapt to the reduced volume of resin due to the elimination of air spaces between the solid particles, and a relatively shallow metering section 34 wherein the resin is predominantly in a molten state with some amount of solid particles remaining. A discharge port 28 is generally employed at the downstream end of the metering section 34.

FIG. 1A represents an enlarged view of a flight channel 38 while defining the components therein such as the helical flight 20 that is wrapped around a core 22 that forms a helix angle 26 when compared to the flight and axis 74 of the screw 10, the flight 20 being comprised of a leading edge 70 for collecting and advancing resinous material towards the discharge port 28, a trailing edge 72 that forms a boundary for said channel 38 and a flight land 24 that represents the top of the flight and the outside diameter of the screw 10, that works in close proximity with the inner wall of said barrel 12. A flight width 25 which represents the distance between the leading edge 70 and the trailing edge 72 when measured across the flight land 24.

Figure 2A:
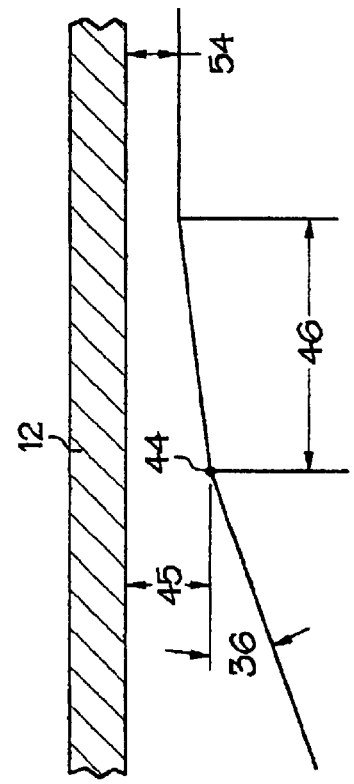
FIG. 2A is the root profile of FIG. 2.

Referring to FIGS. 2 and 2A, the basic option of the invention is represented, working from the transition section 32, that tapers from a generally deep feed depth to a shallow metering depth said taper forming a angle 36, advancing along the axis 74 of the screw towards the discharge port 28, a flight pitch 40 in the transition section that is generally constant with the pitch in the feed section 30, a tangent point or tapered terminus 44 between the transition and metering section that signals the start of an increase in the flight pitch 42 that is about between 1.25 and 1.50 times the original pitch 40, said tangent point or tapered terminus 44 that also forms the starting point for a stepped change in the root 22 of the screw 10 that is not concurrent with the increased pitch 42. The length 46 of the stepped change in the root is generally about between 0.7 to 0.9 or 1.1 to 1.3 times the length of the increased flight pitch 42 generating a measurable length 46 along the axis 74 that exits at a shallow flight depth 54, shallow flight depth 54 that is constant for the remainder of the metering section 47.

A transition section that is tapered from a deep flight depth to a shallow flight depth that forms a angle 36, a tangent point or tapered terminus 44 between the transition section 32 and the metering section 34, that forms a measurable flight depth 45, a channel volume that is calculated using the original flight pitch 40 and flight depth 45. A design that utilizes an increased flight pitch 42 and similar channel volume that when calculated generates a substantially shallower flight metering depth 54. A flight depth 54 that is shallow for good conductive heat transfer, a flight pitch that is extended for more exposure to the barrel wall, and takes place in cooperation with a stepped change in the root.

Referring to FIGS. 3 and 3A, the generally preferred option of the invention is represented, working from the transition section 32, and advancing along the axis 74 of the screw towards the discharge port 28, a flight pitch 40 in the transition section that is generally constant with the pitch in the feed section 30, a tangent point or tapered terminus 44 between the transition and metering section that signals the start of an increase in the flight pitch 42 that is about between 1.20 and 1.30 times the original pitch 40, said tangent point or tapered terminus 44 that also forms the starting point for a stepped change in the root 22 of the screw 10 that is not congruent with the increased pitch 42. The length 46 If the stepped change in the root is generally about between 1.1 to 1.3 times the length of the increased flight pitch 42 generating a measurable length 46 along the axis 74 that exits at a shallow flight depth 54, shallow flight depth 54 that is constant for a distance 47 that varies depending upon the flight length to screw diameter ratio, and resin composite. A second tangent point or tapered terminus 48 that signals another increase in the flight pitch 50 that is about between 1.35 to 1.50 times the original pitch 40, said tangent point or tapered terminus 48 that also forms the starting point for a stepped change in the root 22 of the screw 10 that is not congruent with the increased pitch 50. The length 52 of the stepped change in the root is generally about between 0.7 to 0.9 times the length of the increased flight pitch 50 generating a measurable length 52 along the axis 74 that exits at a shallow flight depth 55, shallow flight depth 55 that is constant for the remainder of the metering section 53. As seen in FIG. 3, the pitch 50 is greater than the pitch 42 which is greater than the pitch 40.

A transition section that is tapered from a deep flight depth to a shallow flight depth, a tangent point or tapered terminus 44 between the transition section 32 and the metering section 34 that forms a measurable flight depth 45, a channel volume that is calculated using the original flight pitch 40 and flight depth 45. A design that utilizes two increases in the flight pitch 42 and 50 in succession, separated by a constant depth flight section 47 and two stepped changes in the root 46 and 52 that are not congruent with the flight pitch, and similar channel volume that when calculated generates a substantially shallower flight metering depth 55. A flight depth 55 that is substantially shallower than normal and a flight pitch 50 that are substantially longer than normal.

I claim:

1. A plasticity apparatus comprising a heatable barrel having inlet and outlet openings; a rotating screw having a root, a helical flight disposed about the root defining a helical valley, said flight being disposed within and cooperating with an inner wall of said barrel; whereby particles of resinous material are introduced through said inlet opening to the helical valley extending along the axis of the screw to be plasticated by said screw and advanced toward said outlet opening; said screw comprising a feed section, a transition section, and a metering section in succession; said flight having a generally constant pitch in the feed and transition sections, said root defining a tapered terminus at a location between the transition and metering sections wherein an increase of the flight pitch begins and said tapered terminus defining a stepped change in said root having a length along said axis which is less than or greater than the length of the increased flight pitch; a portion of said root downstream of said stepped change in said root defining a shallow flight depth in the metering section.

2. The apparatus of claim 1 wherein said increase in the flight pitch is about 1.25 to 1.50 times said constant pitch.

3. The apparatus of claim 1 wherein the length of the stepped change in the root is about 0.7 to 0.9 or 1.1 to 1.3 times the length of the increased flight pitch.

4. A plasticity apparatus comprising a heatable barrel having inlet and outlet openings; a rotating screw having a root, a helical flight disposed about the root defining a helical valley, said flight being disposed within and cooperating with an inner wall of said barrel; whereby particles of resinous material are introduced through, said inlet opening to the helical valley extending along the axis of the screw to be plasticated by said screw and advanced toward said outlet opening; said screw comprising a feed section, a transition section, and a metering section in succession; said flight having a generally constant pitch in the feed and transition sections, said root defining a first tapered terminus at a location between the transition and metering sections wherein a first increase of the flight pitch begins and said first tapered terminus defining a first stepped change in said root having a first length along said axis which is greater than the length of the first increased flight pitch; said root defining a second tapered terminus downstream of said first tapered terminus wherein a second increase in the flight pitch greater than said first increase begins and said second tapered terminus defining a second stepped change in said root having a second length along said axis which is less than the length of the second increased flight pitch; a portion of said root downstream of said second stepped change in said root defining a shallow flight depth in the metering section.

5. The apparatus of claim 4 wherein said increase in the flight pitch is about 1.35 to 1.50 times said constant pitch.

6. The apparatus of claim 4 wherein the length of the first stepped change in the root is about 1.1 to 1.3 times the length of the first increased flight pitch.

7. The apparatus of claim 4 wherein the length of the second stepped change in the root is about 0.7 to 0.9 times the length of the second increased flight pitch.

* * * * *